(No Model.)
B. M. GRAVES.
DISH WASHING MACHINE.
No. 345,380. Patented July 13, 1886.
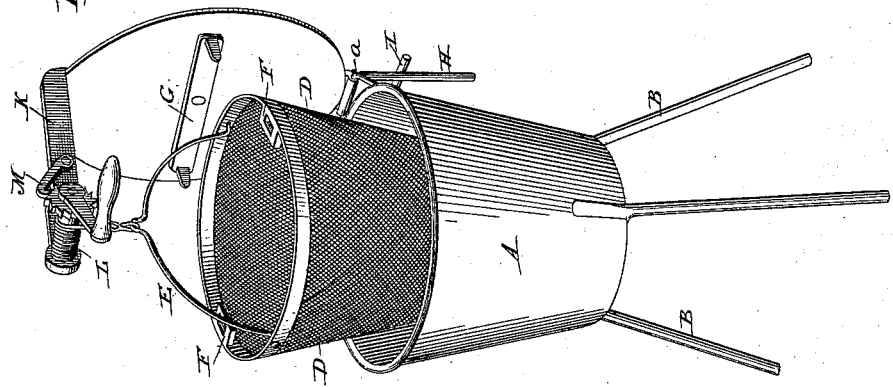
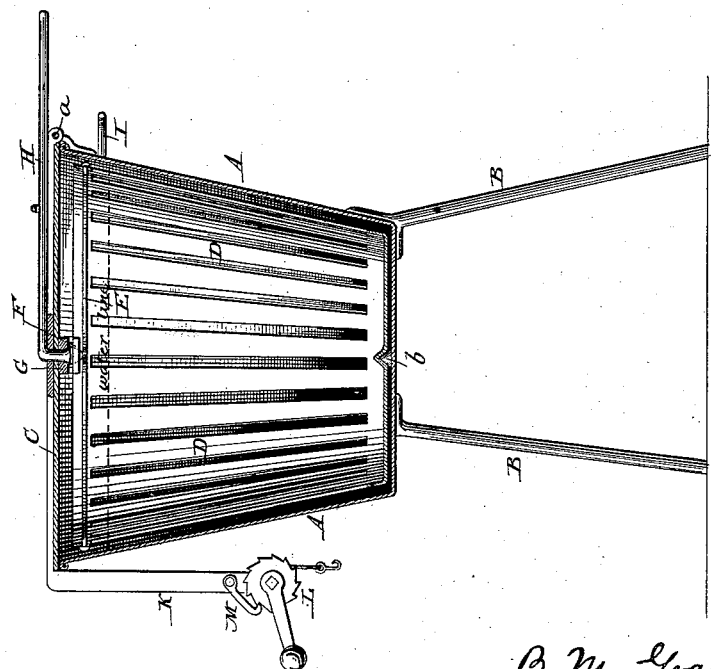
WITNESSES
B. M. Graves
INVENTOR
By Phil. T. Dodge
Attorney
N. PETERS, Photo-Lithographer, Washington, D. C.

UNITED STATES PATENT OFFICE.

BENJAMIN M. GRAVES, OF WATERLOO, ASSIGNOR TO MERT H. C. GRAVES, OF FARMER VILLAGE, NEW YORK.

DISH-WASHING MACHINE.

SPECIFICATION forming part of Letters Patent No. 345,380, dated July 13, 1886.

Application filed February 28, 1885. Renewed March 22, 1886. Serial No. 196,192. (No model.)

*To all whom it may concern:*

Be it known that I, BENJAMIN M. GRAVES, of Waterloo, in the county of Seneca and State of New York, have invented certain Improvements in Dish-Washing Machines, of which the following is a specification.

The aim of this invention is to provide a simple and inexpensive machine by means of which dishes may be thoroughly washed and subsequently drained with the expenditure of little labor on the part of the operator.

Referring to the accompanying drawings, Figure 1 represents a vertical central cross-section through the center of my machine adjusted for operation. Fig. 2 is a perspective view of the same as it appears when opened, with the dish-receiving vessel in its suspended position.

Referring to the drawings, A represents a tight vessel, preferably in the form of an inverted truncated cone, sustained upon legs or other suitable supports, B.

C represents a lid or cover hinged to one side of the body at $a$, and adapted to fit down tightly thereon, so as to prevent the escape of water at the top. A latch or fastening device of any suitable character may be employed, if desired, to hold the lid in a closed position.

D represents the basket or receiving-vessel, which may be constructed of sheet metal, wire, or other appropriate material. It is made of suitable size and form to fit freely within the body, and of sufficient strength to receive and sustain the articles to be washed. At its base the vessel is provided with a central cup or socket to receive a supporting-pivot, $b$, which is fixed centrally at the bottom of the body. The top of the basket, which is left wholly open and unobstructed, is provided with a folding bail or handle, E, by means of which the basket is inserted and removed, this bail being adapted, as shown, to fold down upon or within the basket when not required for use. The basket is further provided at the top, at opposite sides, with two eyes or sockets, F, designed to receive the ends of a cross-bar, G, attached centrally to a pivot or journal extending upward through the center of the lid C, and attached to a horizontal hand-lever, H, which extends backward over the rear edge of the latch in position to be conveniently vibrated by the attendant. When the lid is closed, the depending ends of the cross-bar enter the eyes in the basket and sustain the same in an upright position out of contact with the sides of the body, so that the vibration of the lever will impart a rotary oscillation to the basket and the dishes therein, causing the water or other fluid placed within the body to act violently on the surfaces of the dishes, so as to effect the removal of foreign matters therefrom.

In order to sustain the lid in an upright position during the removal or insertion of the basket or the dishes, the body is provided on its rear side with a rigid arm, I, with which the lever may engage when the lid is open, in the manner represented in Fig. 2, the lever and arm thus co-operating to maintain the lid in its vertical position.

In order that the operator may raise and lower the loaded basket with ease and suspend the same in an elevated position, I provide the lid with a rigid arm, K, which overhangs the body when the lid is open, as shown in Fig. 2. On the end of the arm K is mounted a drum or windlass, L, provided with an operating-crank and a cord or chain having on its end a hook or other device to engage the bail of the basket, and with a ratchet-wheel, which is engaged by a locking dog or pawl, M. The rotation of the crank causes the cord to elevate the basket, and the pawl, engaging automatically, maintains the basket in position. While it is found that the lever and arm are entirely sufficient to maintain the lid, it is to be understood that additional locking or suspending devices may be employed.

Having thus described my invention, what I claim is—

1. The body and its lid, in combination with the removable basket, the external lever, and the internal cross-bar attached to the lever and adapted to engage the edges of the basket.

2. In a dish-washer, the combination, with the body or water-vessel, of the movable basket therein, the hinged lid, means, substantially as described, for locking the lid in an open position, and the hoisting devices attached to the lid.

3. In combination with the body and its hinged lid, the lever and the arm adapted to engage the lever and sustain the lid in an upright position.

4. The body, its hinged lid, the basket, the arm secured to the lid, the hoisting devices attached to the arm, and means, substantially as described, for maintaining the lid in an elevated position.

In testimony whereof I hereunto set my hand in the presence of two attesting witnesses.

BENJAMIN M. GRAVES.

Witnesses:
JOHN T. ARMS,
PHIL. T. DODGE.